(12) United States Patent
Ko et al.

(10) Patent No.: US 11,547,060 B2
(45) Date of Patent: Jan. 10, 2023

(54) PLANT CULTIVATION DEVICE AND METHOD FOR CULTURING PLANT

(71) Applicant: SEOUL VIOSYS CO., LTD., Gyeonggi-do (KR)

(72) Inventors: Sang Min Ko, Gyeonggi-do (KR); Jin Won Kim, Gyeonggi-do (KR)

(73) Assignee: Seoul Viosys Co., Ltd., Gyeonggi-do (KR)

(*) Notice: Subject to any disclaimer, the term of this patent is extended or adjusted under 35 U.S.C. 154(b) by 351 days.

(21) Appl. No.: 16/552,023

(22) Filed: Aug. 27, 2019

(65) Prior Publication Data

US 2020/0068809 A1   Mar. 5, 2020

Related U.S. Application Data

(60) Provisional application No. 62/723,588, filed on Aug. 28, 2018.

(51) Int. Cl.
*A01G 7/04*    (2006.01)
*A01G 9/24*    (2006.01)
*A01G 9/02*    (2018.01)
*H05B 47/16*   (2020.01)

(52) U.S. Cl.
CPC ............... *A01G 7/045* (2013.01); *A01G 9/02* (2013.01); *A01G 9/246* (2013.01); *A01G 9/249* (2019.05); *H05B 47/16* (2020.01)

(58) Field of Classification Search
CPC ................. A01G 7/045; A01G 9/249
See application file for complete search history.

(56) References Cited

U.S. PATENT DOCUMENTS

| 2006/0006820 A1* | 1/2006 | Roseman ............... A01G 7/045 |
| | | 315/312 |
| 2008/0120736 A1 | 5/2008 | Hurst |
| 2011/0016785 A1 | 1/2011 | Yamada et al. |

(Continued)

FOREIGN PATENT DOCUMENTS

| EP | 3834606 A1 | 6/2021 |
| JP | 2003-339236 A | 12/2003 |

(Continued)

OTHER PUBLICATIONS

International Search Report and Written Opinion for Application No. PCT/KR2019/010997 dated Dec. 6, 2019, 12 pages.

(Continued)

*Primary Examiner* — Monica L Perry
(74) *Attorney, Agent, or Firm* — LaBatt, LLC

(57) ABSTRACT

A plant cultivation device includes a light source unit having a first light source emitting stimulation light in a UV region toward a plant and a second light source emitting background light toward the plant, the background light having a different peak wavelength than the stimulation light. The second light source emits the background light during a light period and stops emission of the background light during a dark period. In addition, the first light source emits the stimulation light for a certain period of time during the light period. Further, a cumulative amount of the stimulation light emitted from the first light source is 0.036 J or more per day.

13 Claims, 13 Drawing Sheets

(56) References Cited

U.S. PATENT DOCUMENTS

| | | | |
|---|---|---|---|
| 2014/0344100 A1* | 11/2014 | Fok | G06Q 30/0621 |
| | | | 705/26.5 |
| 2016/0360712 A1* | 12/2016 | Yorio | A01G 9/1423 |
| 2017/0311553 A1 | 11/2017 | Dobrinsky et al. | |
| 2018/0007838 A1 | 1/2018 | McCord | |
| 2018/0184602 A1* | 7/2018 | Ofir | A01G 9/24 |

FOREIGN PATENT DOCUMENTS

| | | |
|---|---|---|
| JP | 2012-205520 A | 10/2012 |
| WO | 2014-085626 A1 | 6/2014 |

OTHER PUBLICATIONS

Extended European Search Report for corresponding EP Application No. 19855903.1, dated Apr. 14, 2022, 9 pages.

* cited by examiner

PLANT CULTIVATION DEVICE AND METHOD FOR CULTURING PLANT

CROSS-REFERENCE TO RELATED APPLICATION

The present application is a nonprovisional application which claims priority to Provisional Application Ser. No. 62/723,588 filed Aug. 28, 2018 and entitled "Plant Cultivation Device And Method For Culturing Plant," the disclosure of which is hereby incorporated in its entirety by reference as set forth herein.

TECHNICAL FIELD

Embodiments of the present disclosure relate to a plant cultivation device and an herb cultivation method using the same.

BACKGROUND ART

Herbs are aromatic plants that are used in cooking and medicine. Herbs are known to have efficacies such as deodorization, stress relief, and relaxation. Recently, as these efficacies of herbs are widely known, herbs are being raised at home or given as presents.

However, an indoor environment is different from an outdoor environment in terms of light intensity, light properties, air flow, and temperature difference between day and night being smaller than that in the outdoor environment. Due to these differences, herbs cultivated indoors emanate almost no fragrance or allow the scent thereof to be caught only in the vicinity thereof.

SUMMARY

Embodiments of the present disclosure provide an herb cultivation device and method which can cultivate fragrant herbs even indoors. Embodiments of the present disclosure provide an herb cultivation device which can spread fragrance of herbs much farther.

In accordance with one aspect of the present disclosure, an herb cultivation device includes: a main body having an internal space for cultivation of an herb; a light source unit including a first light source emitting UV light; and an air blower forcing air around the herb to flow. Here, the first light source emits UV light toward the herb. The herb produces an increased amount of secondary metabolites including terpenes due to the UV light.

In accordance with another aspect of the present disclosure, an herb cultivation method includes cultivating an herb by fixing an underground portion of the herb to a medium or water. Here, cultivating the herb includes irradiating the herb with UV light and forcing air around the herb to flow. The herb produces an increased amount of secondary metabolites including terpene due to the UV light.

An herb cultivation device and method according to the embodiments of the present disclosure can increase the content of fragrant materials in an herb and spread fragrance of the herb much farther by supplying UV light and air to the herb. In addition, the herb cultivation device and method according to the embodiments of the present disclosure can increase the content of fragrant materials in an herb by irradiating the herb with visible light.

DETAILED DESCRIPTION OF EMBODIMENTS

Figure 1:
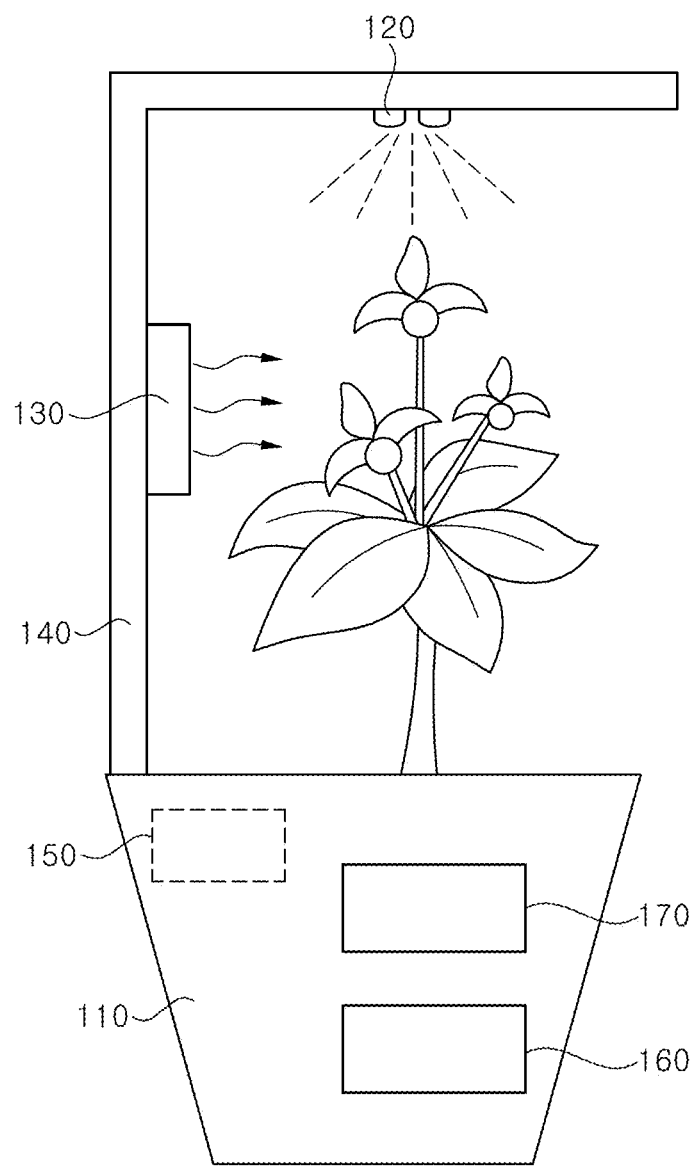
FIG. 1 is a schematic view of an herb cultivation device according to a first embodiment of the present disclosure.

Hereinafter, embodiments of the present disclosure will be described with reference to the accompanying drawings. It should be understood that the present disclosure is not limited to the following embodiments and may be embodied in different ways and that the embodiments are provided for complete disclosure and thorough understanding of the present disclosure by those skilled in the art. Therefore, the present disclosure is not limited to the following embodiments and may be embodied in different ways. It should be noted that the drawings may be exaggerated in width, length, and thickness of components for descriptive convenience and clarity only. Like components will be denoted by like reference numerals throughout the specification.

An herb cultivation device according to embodiments of the present disclosure includes: a main body having an internal space for cultivation of an herb; a light source unit including a first light source emitting UV light; and an air blower forcing air around the herb to flow. Here, the first light source emits UV light toward the herb. The herb produces an increased amount of secondary metabolites including terpenes due to the UV light.

In some embodiments, the first light source may be a light emitting diode that emits UV light. The light source unit may further include a second light source emitting visible light toward the herb. The second light source may be a light emitting diode that emits visible light. The air blower may be a fan.

The herb cultivation device may further include a controller controlling operation of at least one of the light source unit and the air blower. The herb cultivation device may further include an input unit receiving a signal for controlling operation of at least one of the light source unit and the air blower. The internal space of the main body may be filled with at least one of a medium and water. The medium and the water may contain nutrients.

An herb cultivation method according to embodiments of the present disclosure includes cultivating an herb by fixing an underground portion of the herb to a medium or water. Here, cultivating the herb includes irradiating the herb with UV light and forcing air around the herb to flow. The herb produces an increased amount of secondary metabolites including terpene due to the UV light. In irradiating the herb with UV light, the UV light may be emitted from a light emitting diode.

Forcing air around the herb to flow may include forcing air around the herb to flow using a fan. Cultivating the herb may further include irradiating the herb with visible light. In irradiating the herb with visible light, the visible light may be emitted from a light emitting diode. The medium and water may contain nutrients.

Reference will now be made in detail to various embodiments, examples of which are illustrated in the accompanying drawings.

FIG. 1 is a schematic view of an herb cultivation device according to a first embodiment of the present disclosure. An herb cultivation device 100 according to a first embodiment includes a main body 110, a light source unit 120, and an air blower 130. The main body 110 has an internal space for cultivation of an herb.

An underground portion of the herb, corresponding to the root, is situated in the internal space of the main body 110. In addition, the internal space of the main body 110 is filled with water or a medium supporting the herb and supplying moisture to the herb. Here, the medium and water may contain nutrients for growth of the herb.

The light source unit 120 emits UV light. For example, the light source unit 120 includes a light emitting diode that emits UV light. The light source unit 120 emits UV light toward the herb. For example, the light source unit 120 may emit at least one of UVA light, UVB light and UVC light.

UV irradiation at an intensity exceeding a certain threshold or for a period of time exceeding a certain threshold acts as a stressor to plants. Plants produce an increased amount of secondary metabolites to resist UV-induced stress. That is, UV light emitted from the light source unit 120 is stimulation light for applying stress to the herb.

Upon irradiation with UV light, the herb produces a lot more volatile secondary metabolites including alkaloids, phenols, sterols, steroids, lignins, and terpenes due to UV-induced stress. Fragrance of the herb is mostly caused by fragrant materials including terpenes. According to this embodiment, the herb cultivation device 100 can increase the content of fragrant materials in the herb using the light source unit 120 that emits UV light.

An experiment of cultivating an herb under UV radiation was conducted as follows. Specifically, herbs were irradiated with UV light using an LED under conditions of 100 PPFD ($\mu$ mol/m$^2$/s). Here, rosemary, lavender, and peppermint were used as a test object, i.e., herbs. Fragrant materials of three treatment groups and a control group were measured by gas chromatography, where the treatment groups were exposed to UV light at an irradiance of 10 $\mu$W/cm$^2$ for 1, 3, and 6 hours from the beginning of each photoperiod, respectively, and the control group was not exposed to UV light. Here, the UV light may be one of UVA light, UVB light and UVC light. For example, the UV light may have a wavelength of 295 nm.

The air blower 130 forces air around the herb to flow. For example, the air blower 130 may be a fan. In other embodiments, the air blower 130 may not be limited to a fan. The air blower 130 generates a current of air to force air around the herb to flow. The air blower 130 allows the herb to receive sufficient carbon dioxide by forcing the air around the herb to flow. Carbon dioxide is essential for photosynthesis of plants. If carbon dioxide is not sufficiently supplied to a plant, the photosynthetic rate of that plant decreases. Decrease in photosynthetic rate results in slow growth of the plant and thus reduction in production of secondary metabolites.

The herb cultivation device 100 according to this embodiment can supply sufficient carbon dioxide to the herb by ventilating a space around the herb using the air blower 130. Thus, the herb cultivation device 100 can allow the herb to grow normally by supplying sufficient carbon dioxide to the herb. Further, the herb cultivation device 100 can increase the photosynthetic rate of the herb, thereby allowing fast growth of the herb. As the photosynthetic rate of the herb increases, production of the secondary metabolites increases, causing increase in content of fragrant materials in the herb. That is, with the air blower 130, the herb cultivation device 100 according to this embodiment can increase the content of fragrant materials in the herb.

If the air around the herb does not flow, as shown in FIG. 1, fragrant molecules generated from the herb can remain stagnant around the herb. The herb cultivation device 100 can diffuse the fragrant molecules around the herb by forcing the air around the herb to flow using the air blower 130. Thus, the herb cultivation device 100 can spread the fragrance of the herb over a wider area.

The herb includes trichomes formed on leaves and stems thereof, and the fragrant materials accumulate between cell walls and cuticle layers of the trichomes. With the air blower 130, the herb cultivation device 100 can stimulate leaves of the herb or force the leaves to collide with one another and tear the cuticle layers, thereby allowing release of the fragrant materials. In other words, the herb cultivation device 100 can stimulate regions of the herb where the fragrant materials accumulate using the air blower 130, thereby allowing release of the fragrant materials, whereby a stronger fragrance can emanate from the herb.

According to this embodiment, the light source unit 120 and the air blower 130 are disposed on a support 140 connected to the main body 110. The support 140 has a lower portion extending from one side of the main body 110 in an upward direction and an upper portion bent from the lower portion to be located above the main body 110. The light source unit 120 is secured to the upper portion of the support 140 to be located above the herb and the air blower 130 is secured to the lower portion of the support 140 to be located on a side of the herb.

Referring to FIG. 1, the light source unit 120 and the air blower 130 are secured to the support 140 and the support 140 is secured to the main body 110. However, it should be understood that the present disclosure is not limited thereto. A location of the support 140 and locations of the light source unit 120 and the air blower 130 on the support 140 may be changed. In addition, the support 140 may not be secured to the main body 110, or the light source unit 120 and the air blower 130 may be secured to respective separate supports.

The herb cultivation device 100 according to this embodiment may further include a controller 150 controlling operation of at least one of the light source unit 120 and the air blower 130. The controller 150 may control operation of the light source unit 120, such as UV intensity, UV irradiation time, and the like, according to pre-stored data or user-input data.

For example, the light source unit 120 may include a plurality of light emitting diodes. Here, the controller 150 may regulate the intensity of UV emitted from the light source unit 120 by controlling the number of light emitting diodes to which current is supplied according to the information about an input UV intensity. In addition, the controller 150 may regulate a UV irradiation time by controlling a period of time for which current is supplied to the light emitting diodes according to the information about an input UV irradiation time. Further, the controller 150 may control the operation time and intensity of the air blower 130 according to pre-stored data or user-input data.

The herb cultivation device 100 according to this embodiment may further include an input unit 160 and a display unit 170. The input unit 160 receives data on the operation of the light source unit 120 and the air blower 130. In addition, the display unit 170 displays general data on the herb cultivation device 100, including data on the operation of the light source unit 120 and the air blower 130.

Although the herb cultivation device 100 is shown as including the controller 150, the input unit 160, and the display unit 170 in FIG. 1, it should be understood that the present disclosure is not limited thereto. For example, at least one of the controller 150, the input unit 160, and the display unit 170 may be omitted from the herb cultivation device 100.

The herb cultivation device 100 according to this embodiment supplies UV light and air to the herb using the UV light source unit and the air blower 130. Thus, the herb cultivation device 100 can increase the content of fragrant materials in the herb and can allow fragrance of the herb to spread over a wider area by cultivating the herb through supply of UV light and air.

Figure 2:
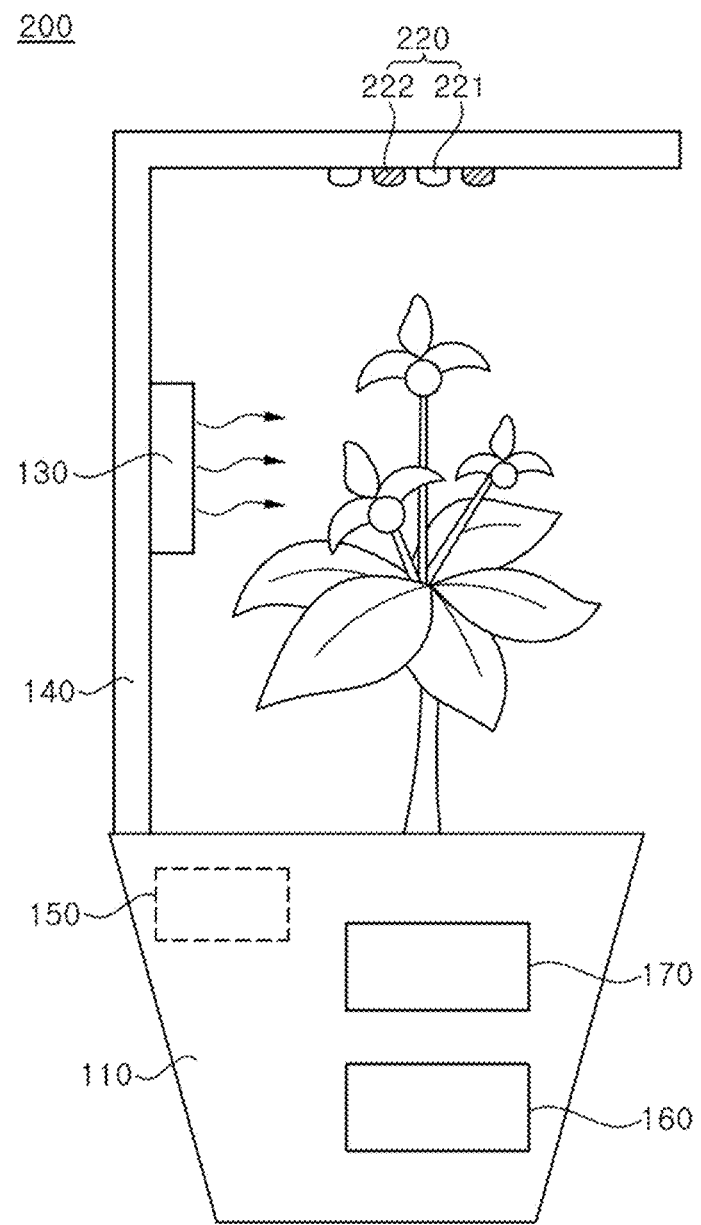
FIG. 2 is a schematic view of an herb cultivation device according to a second embodiment of the present disclosure.
Figure 3:
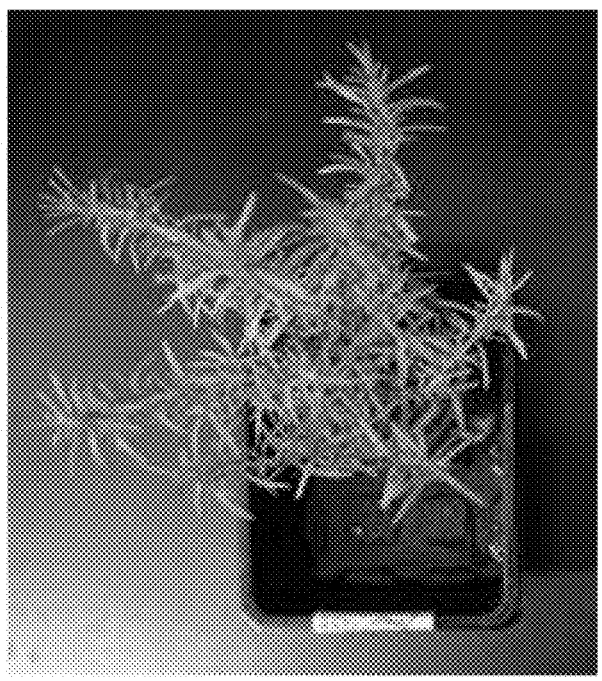
FIG. 3 is an image of rosemary grown under background light treatment of a light intensity of 250 PPFD.
Figure 4:
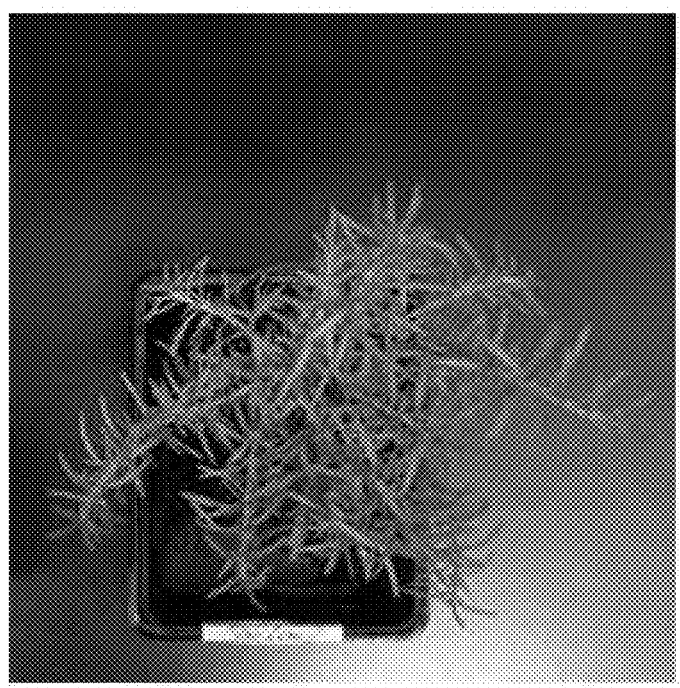
FIG. 4 is an image of rosemary grown under background light treatment of a light intensity of 500 PPFD.

FIG. 2 is a schematic view of an herb cultivation device 200 according to a second embodiment of the present disclosure. Referring to FIG. 2, an herb cultivation device 200 according to a second embodiment includes a main body 110, a light source unit 220, and an air blower 130.

The herb cultivation device 200 according to the second embodiment differs from the herb cultivation device 100 according to the first embodiment in terms of the light source unit 220. Specifically, the light source unit 220 of the herb cultivation device 200 according to the second embodiment emits UV light and visible light, whereas the light source unit 120 of the herb cultivation device 100 according to the first embodiment emits UV light.

Therefore, the configuration of the light source unit 220 related to emission of visible light will be mainly described and description of other components will be omitted in this embodiment. As to the other components, see the description of the herb cultivation device 100 according to the first embodiment. According to this embodiment, the light source unit 220 includes a first light source 221 and a second light source 222.

The first light source 221 emits UV light and the second light source 222 emits visible light. For example, the first light source 221 includes a light emitting diode that emits UV light. In addition, the second light source 222 includes a light emitting diode that emits visible light. The first light source 221 can increase the content of fragrant materials in the herb by irradiating the herb with UV light. That is, light emitted from the first light source 211 is stimulation light for applying stress to the herb.

The second light source 222 emits visible light toward the herb. Visible light is used in photosynthesis of plants. The photosynthetic rate increases with increasing intensity of visible light. The second light source 222 according to this embodiment serves to supplement natural light incident on the herb, thereby increasing the photosynthetic rate of the herb. Thus, with the second light source 222, the herb cultivation device 200 according to this embodiment can increase the photosynthetic rate of the herb, thereby increasing the growth rate of the herb.

In addition, the herb cultivation device 200 according to this embodiment can increase production of the secondary metabolites by increasing the photosynthetic rate of the herb using the second light source 222. Thus, the herb cultivation device 200 can increase the content of fragrant materials in the herb by increasing production of the secondary metabolites of the herb. That is, light emitted from the second light source 222 is used for growth of the herb and may be referred to as background light.

The controller 150 may control the first light source 221 and the air blower 130 to regulate the intensity of UV light and the air blower, the UV irradiation time, and the air blowing time. In addition, the controller 150 may control operation of the second light source 222 to regulate the intensity of visible light and the visible light irradiation time. Thus, the herb cultivation device 200 according to the second embodiment can provide efficient increase in content of fragrant materials in the herb by supplementing natural light with visible light using the second light source 222.

The herb cultivation device according to the embodiments may be manufactured in a small size to be used for household purposes. Such a household herb cultivation device may be used for ventilation of the interior of a house. In addition, the household herb cultivation device may be used for mental/physical stability, fatigue recovery, sleep induction, change of surroundings, and pain relief.

In addition, the herb cultivation device according to the present disclosure may be manufactured in a large size to be used in, for example, plant factories for mass cultivation of herbs. Further, the herb cultivation device can cultivate herbs suitable for extraction of essential oils by increasing the content of fragrant materials in the herbs. Since the herb cultivation device can cultivate herbs having increased fragrant material content, it is possible to extract highly concentrated essential oils using a small number of herbs.

Experiment 1

Experiment 1 is an experiment to ascertain a growth status of an herb upon under treatment with background light. As a representative example of herbs, rosemary was used in this experiment. Rosemary is an antibacterial and bactericidal plant and has leaves with a dark green upper surface.

Rosemary samples were grown under conditions of $27\pm2°$ C. and $30\pm5\%$ RH for 6 weeks. Here, the rosemary samples were treated with background light under conditions that a background light source was alternately turned on and off at time intervals of 12 hours.

In this experiment, growth statuses of Experimental group 1, Experimental group 2, and Experimental group 3, that is, rosemary samples grown under background light 1, background light 2, and background light 3 having different intensities, were compared with one another.

First, Experimental group 1 was a rosemary sample grown under background light 1. Background light 1 was light emitted from a typical indoor lamp composed of a white LED. Background Light 1 had a light intensity (photosynthetic photon flux density) of 7 PPFD ($\mu$ mol/m$^2$/s).

Experimental group 1 had a weak fragrance despite having green leaves. In addition, Experimental group 1 underwent succulent growth and, eventually, leaves thereof withered. It could be seen that background light 1 did not supply a sufficient amount of light for growth of rosemary, considering that Experimental group 1 underwent succulent growth.

Experimental group 2 was a rosemary sample grown under background light 2. Background light 2 was mixed light emitted from a light source composed of a red LED, a white LED, and a blue LED. Background light 2 had a light intensity of 250 PPFD.

Experimental group 2 had leaves partially tinged with red and had a stronger fragrance than Experimental group 1. In addition, Experimental group 2 grew normally without succulent growth.

Experimental group 3 was a rosemary sample grown under background light 3. Background light 3 was mixed light emitted from a light source composed of a red LED, a white LED, and a blue LED. Background light 3 had a light intensity of 500 PPFD. Experimental group 3 had leaves mostly tinged with red despite having a stronger fragrance than Experiment Group 2.

Based on the results of Experiment 1, it can be seen that it is desirable that a light intensity of background light have a 250 PPFD or less, considering the growth, fragrance, and visual facet of rosemary. In addition, since rosemary is likely to undergo succulent growth at an excessively low light intensity, background light should have a 500 PPFD or more, which is a minimum light intensity required for normal growth of herbs.

Experiment 2

Experiment 2 is an experiment to ascertain change in contents of fragrant materials depending upon UV treatment time for herbs.

Rosemary samples were grown under conditions of 27±2° C. and 30±5% RH for 6 weeks. Here, the rosemary samples were treated with background light under conditions that a background light source was alternately turned on and off at intervals of 12 hours. In addition, the rosemary samples were irradiated with UV light for 1 hour, 3 hours, or 6 hours each time the rosemary samples were irradiated with background light. In this experiment, the background light was white light emitted from a white LED and had a light intensity of 100 PPFD. In addition, the UV light was light emitted from a UV LED (10 μW/cm$^2$) and had a wavelength of 295 nm. That is, a UV LED turned on for 1 hour per day emitted 0.036 J of energy per day toward the rosemary samples. A UV LED turned on for 3 hours per day emitted 0.108 J of energy per day toward the rosemary samples. In addition, a UV LED turned on for 6 hours per day emitted 0.216 J of energy per day toward the rosemary samples.

Figure 5:
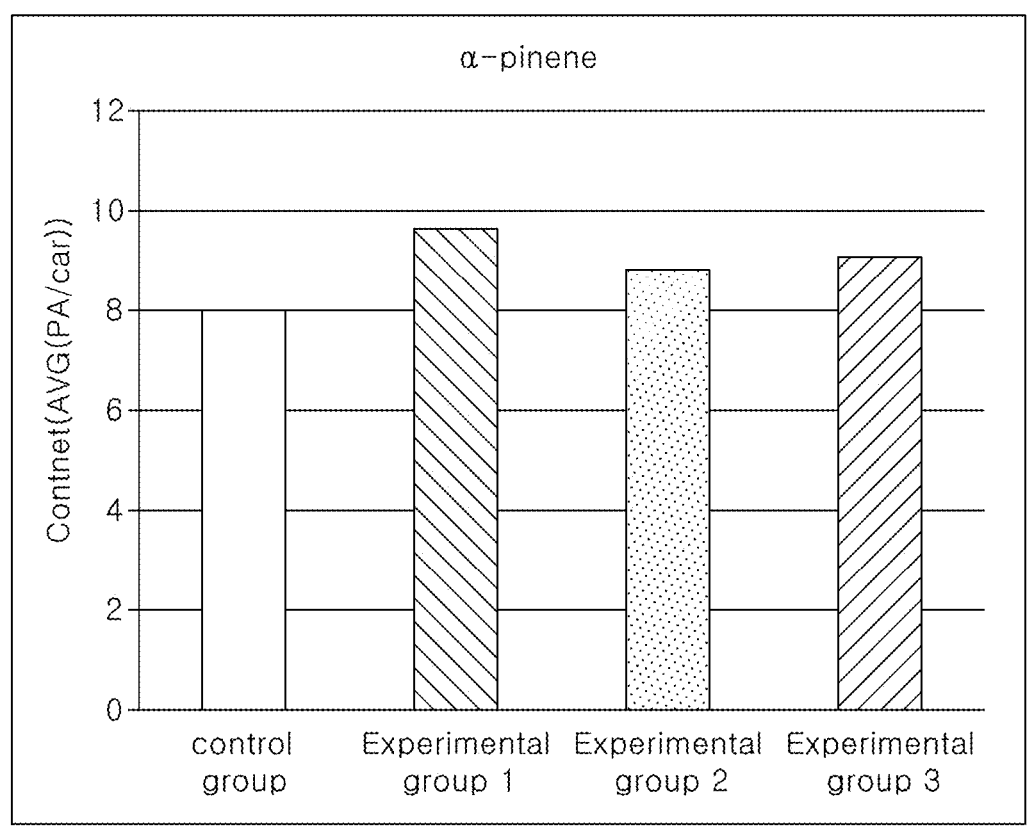
FIG. 5 to FIG. 8 are graphs showing change in contents of fragrant materials in an herb according to Experiment 2.
Figure 6:
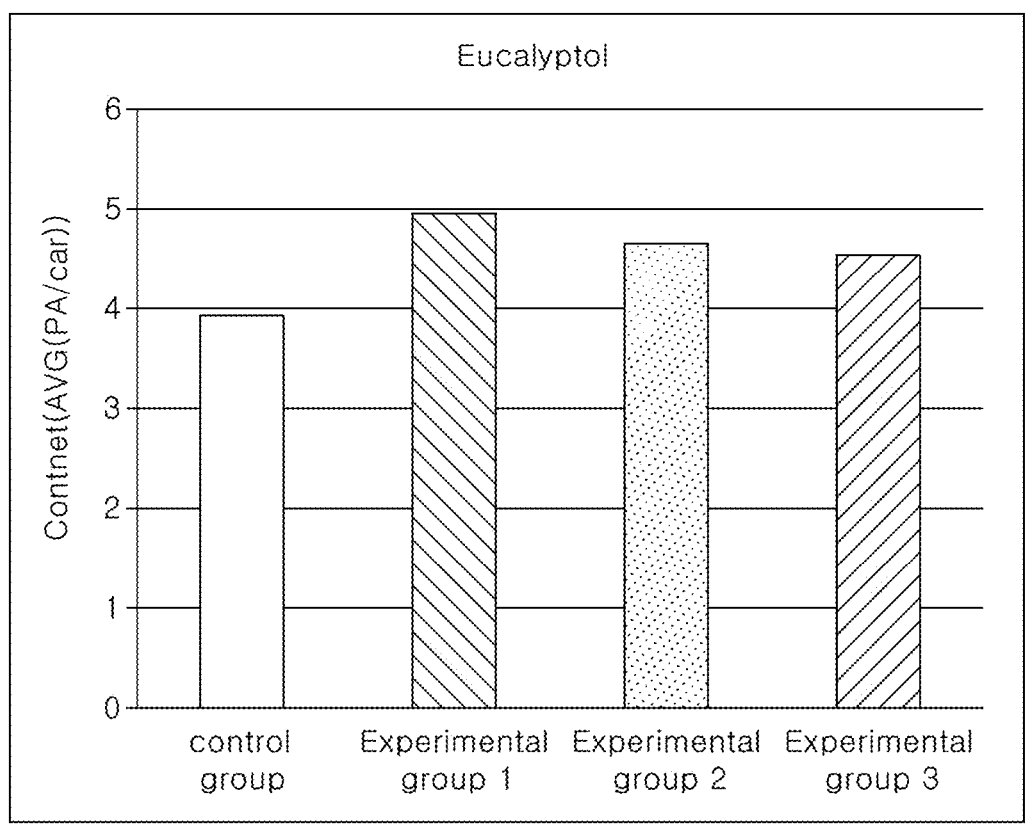
Figure 7:
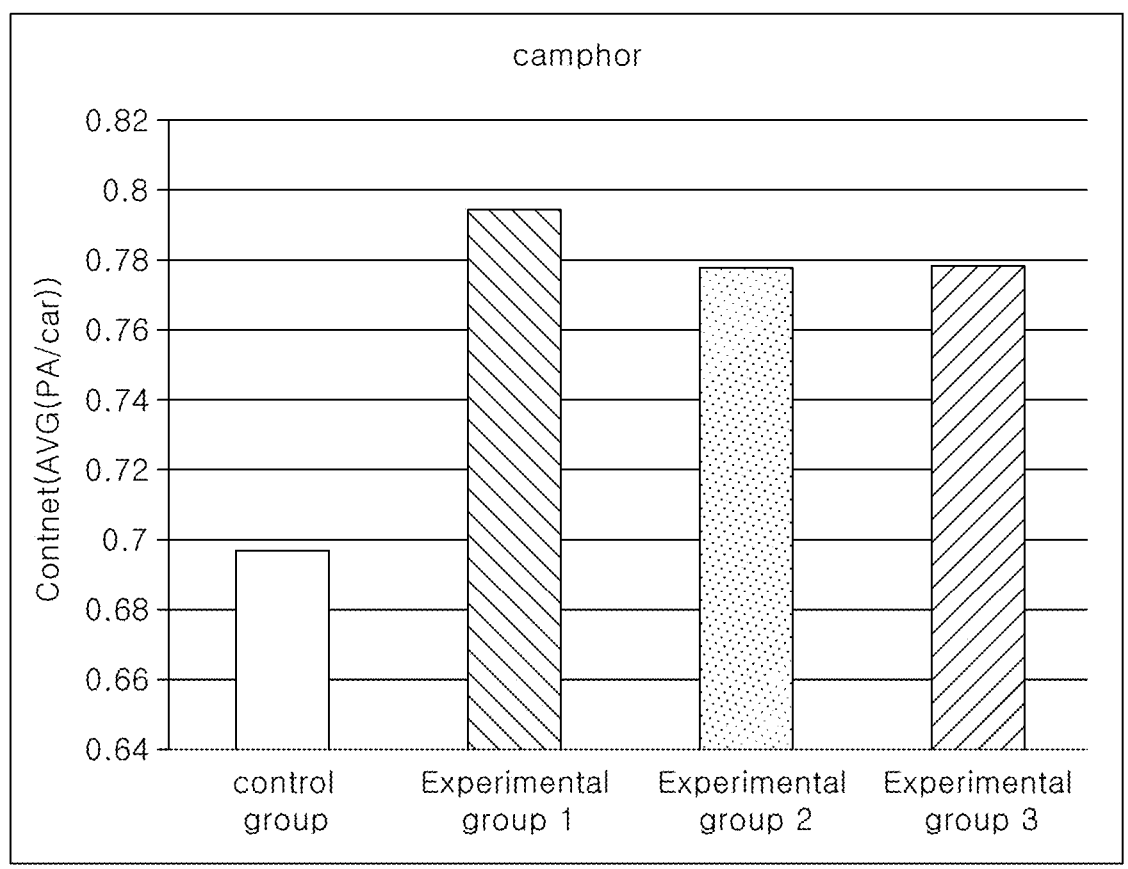
Figure 8:
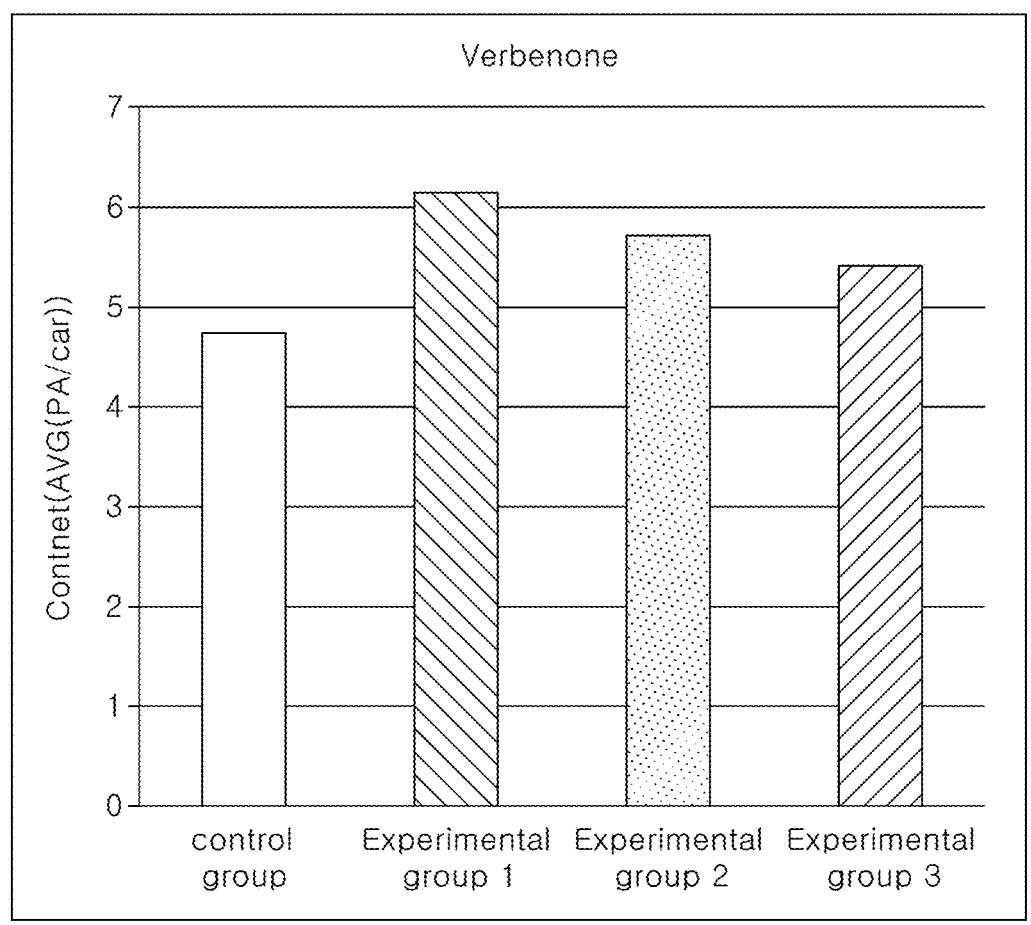

FIG. 5 to FIG. 8 are graphs showing change in contents of fragrant materials in an herb depending upon UV treatment time. FIG. 5 shows change in content of α-pinene, FIG. 6 shows change in content of eucalyptol, FIG. 7 shows change in content of camphor, and FIG. 8 shows change in content of verbenone.

A control group was a rosemary sample subjected to background light treatment only without UV treatment. Experimental group 1 was a rosemary sample subjected to UV treatment for 1 hour per day upon irradiation with background light. Experimental group 2 was a rosemary sample subjected to UV treatment for 3 hours per day upon irradiation with background light. In addition, Experimental group 3 was a rosemary sample subjected to UV treatment for 6 hours per day upon irradiation with background light.

Referring to FIG. 5 to FIG. 8, it can be seen that Experimental groups 1 to 3 had increased contents of all of the fragrant materials, as compared with the control group. Particularly, among Experimental groups, Experimental group 1 had highest contents of the fragrant materials. That is, it can be seen that UV treatment for 1 hour per day is most effective in increasing contents of the fragrant materials.

Experiment 3

Experiment 3 is an experiment to ascertain effects of UV treatment on herbs depending upon light intensity of background light.

Rosemary samples were grown under conditions of 27±2° C. and 30±5% RH for 2 weeks. Here, the rosemary samples were treated with background light under conditions that a background light source was alternately turned on and off at intervals of 12 hours. In addition, the rosemary samples were irradiated with UV light for 1 hour each time the rosemary samples were irradiated with background light. That is, the rosemary samples were treated with UV light for 1 hour per day. Here, the background light was white light emitted from a white LED.

In this experiment, a control group was a rosemary sample grown under background light treatment only and an experimental group was a rosemary sample grown under background light treatment and UV treatment. Fragrant materials measured in this experiment are α-pinene, eucalyptol, camphor, verbenone, and isobornyl acetate.

Figure 9:
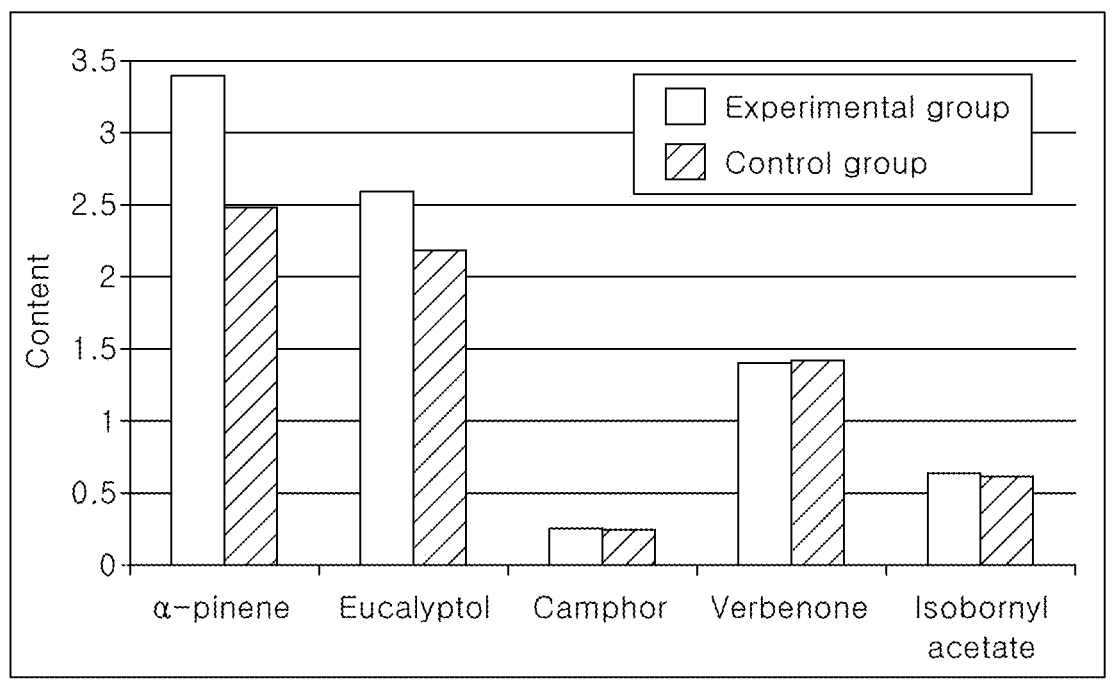
FIG. 9 to FIG. 11 are graphs showing change in contents of fragrant materials in an herb according to Experiment 3.

FIG. 9 is a graph showing UV treatment-induced change in contents of fragrant materials under background light having a light intensity of 50 PPFD. A control group was a rosemary sample subjected to background light treatment at a light intensity of 50 PPFD and an experimental group was a rosemary sample subjected to background light treatment at a light intensity of 50 PPFD and UV light treatment at a wavelength of 285 μm.

Referring to FIG. 9, the experimental group had significantly low α-pinene and eucalyptol contents, as compared with the control group. In addition, there was no significant difference in camphor, verbenone, and isobornyl acetate contents between the experimental group and the control group. That is, if background light has a light intensity of 50 PPFD, the total contents of the fragrant materials decrease under UV treatment.

Figure 10:
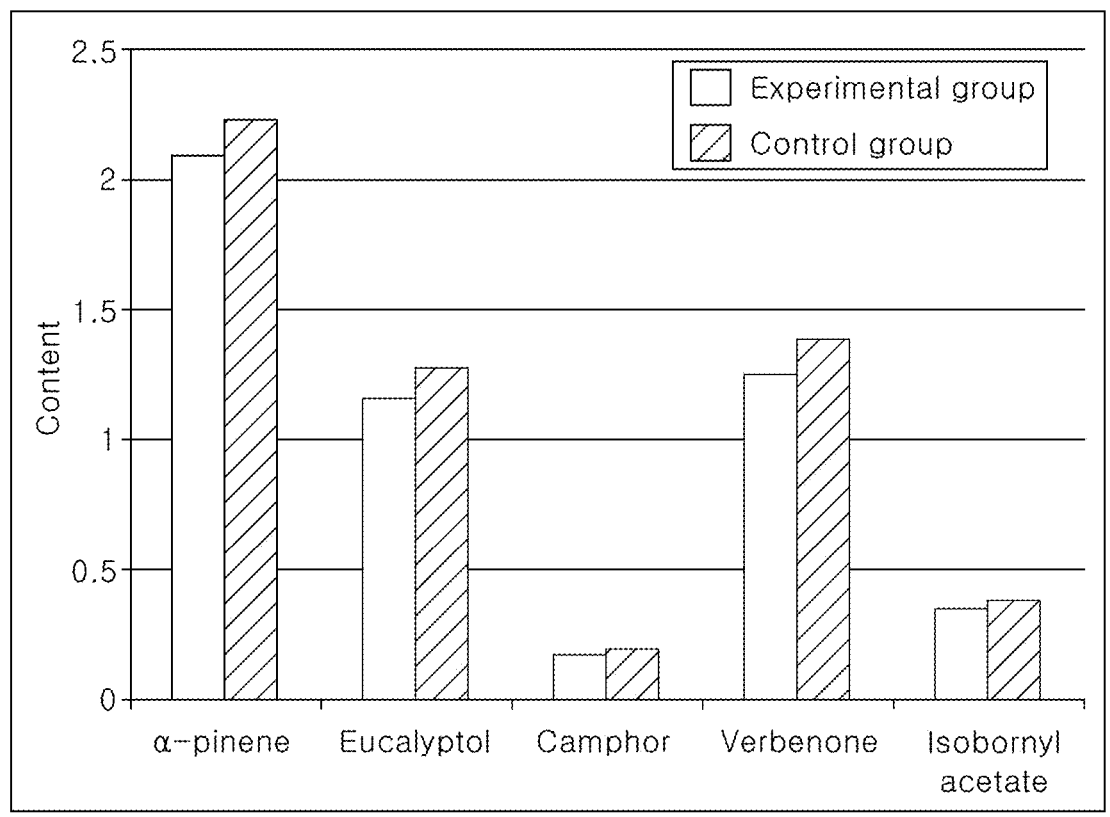

FIG. 10 is a graph showing UV treatment-induced change in contents of fragrant materials under background light having a light intensity of 100 PPFD. A control group was a rosemary sample subjected to background light treatment at a light intensity of 100 PPFD and an experimental group was a rosemary sample subjected to background light treatment at a light intensity of 100 PPFD and UV light treatment at a wavelength of 285 μm. Referring to FIG. 10, the contents of all of the fragrant materials measured in the experimental group increased, as compared with those measured in the control group.

Figure 11:
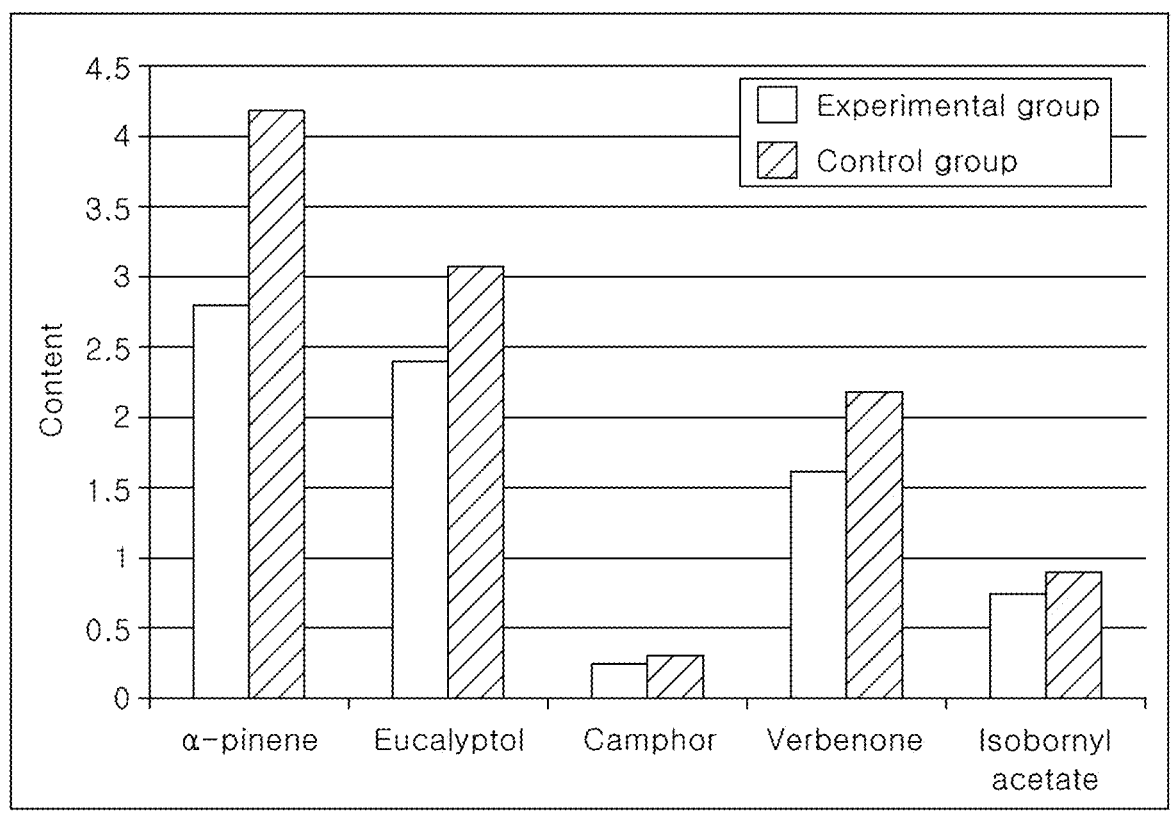

FIG. 11 is a graph showing UV treatment-induced change in contents of fragrant materials under background light having a light intensity of 200 PPFD. A control group was a rosemary sample subjected to background light treatment at a light intensity of 200 PPFD and an experimental group was a rosemary sample subjected to background light treatment at a light intensity 200 PPFD and UV light treatment at a wavelength of 295 μm. Referring to FIG. 11, the contents of all of the fragrant materials measured on the experimental group increased, as compared with those measured on the control group.

Experiment 4

Experiment 4 is an experiment to compare contents of fragrant materials in an herb between when the herb is subjected to UV treatment and when the herb is subjected to another stimulation treatment.

Rosemary samples were grown under conditions of 27±2° C. and 30±5% RH for 2 weeks. Here, the rosemary samples were treated with background light under conditions that a background light source was alternately turned on and off at intervals of 12 hours. In addition, the rosemary samples were irradiated with UV light for 1 hour each time the rosemary samples were irradiated with background light. In this experiment, the background light was white light emitted from a white LED and had a light intensity of 200 PPFD. In addition, the UV light was light emitted from a UV LED (10 μW/cm$^2$) and had a wavelength of 285 μm A control group was a rosemary sample grown under background light treatment and UV treatment. Experimental group 1 was a rosemary sample grown under background light treatment and treatment with methyl jasmonate. Experimental group 2 was a rosemary sample grown under background light treatment, UV treatment, and methyl jasmonate treatment. Herein, methyl jasmonate treatment refers to spraying methyl jasmonate onto surfaces of leaves of rosemary.

Figure 12:
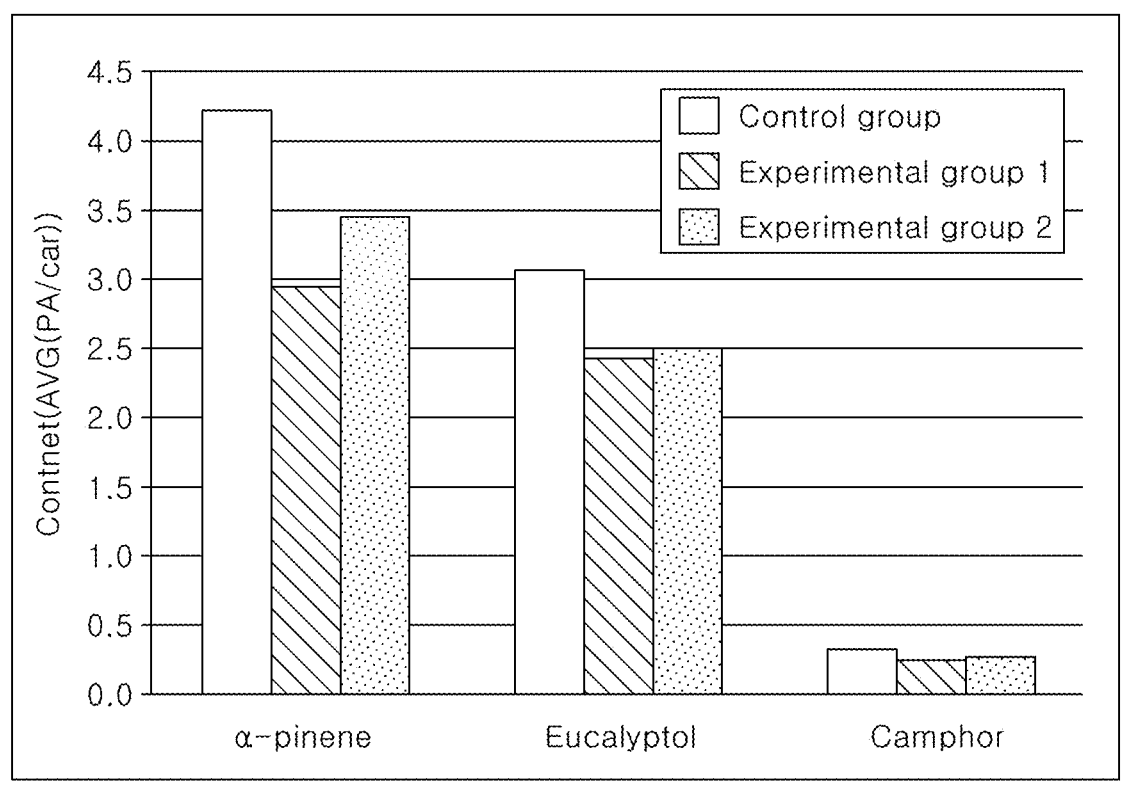
FIG. 12 to FIG. 13 are graphs showing change in contents of fragrant materials in an herb according to Experiment 4.
Figure 13:
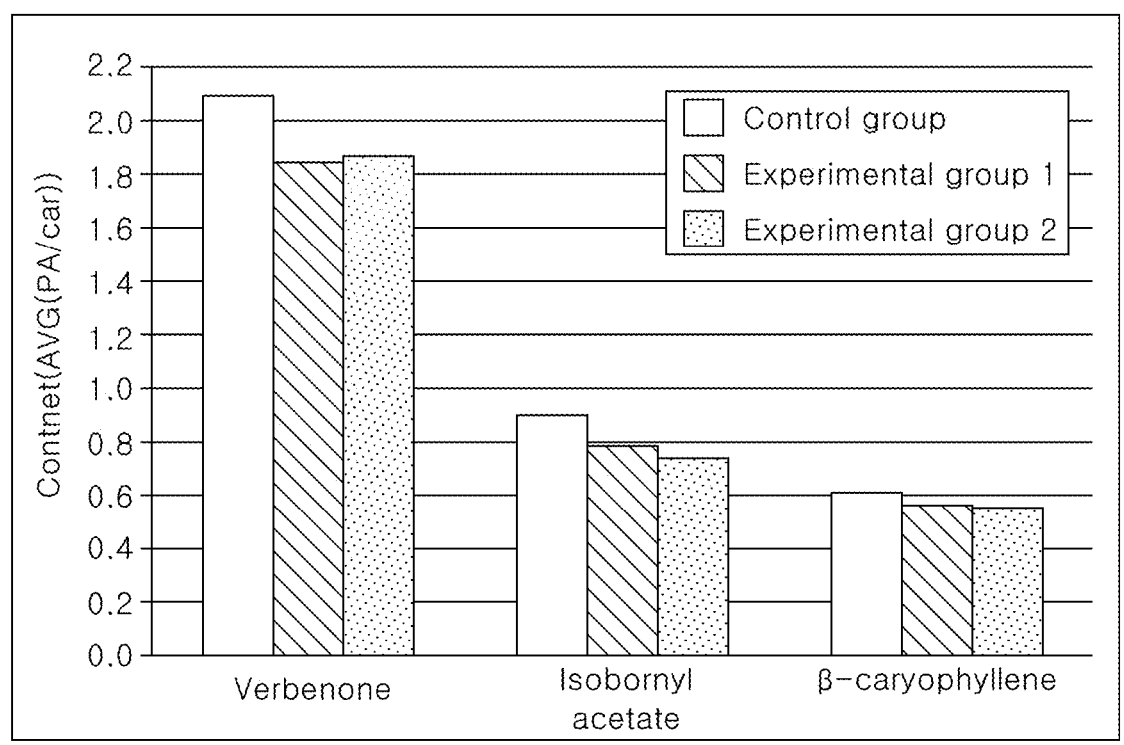

FIG. 12 is a graph showing change in contents of α-pinene, eucalyptol, and camphor. FIG. 13 is a graph showing change in contents of verbenone, isobornyl acetate, and β-caryophyllene. Referring to FIG. 12 and FIG. 13, contents of all of the fragrant materials measured in the control group were higher than those measured in Experimental groups 1 and 2. That is, rosemary grown under background light treatment and UV treatment without methyl jasmonate treatment has higher contents of fragrant materials than rosemary further treated with methyl jasmonate.

From the results of Experiments 1 to 4, it was confirmed that treating an herb with UV light can increase contents of fragrant materials in the herb. In particular, it can be seen that background light should have a light intensity of greater than 50 PPFD and less than or equal to 250 PPFD in order to allow normal growth of an herb and to increase contents of fragrant materials in the herb. Further, it can be seen that UV treatment for 1 hour per day is most effective in increasing contents of fragrant materials.

Although some embodiments have been described herein, it should be understood that these embodiments are provided for illustration only and are not to be construed in any way as limiting the present disclosure. The scope of the present disclosure should be defined by the appended claims and equivalents thereof.

We claim:

1. A plant cultivation device for plants having trichomes, comprising:
a light source unit comprising a first light source emitting stimulation light in an ultraviolet (UV) region toward a target plant having trichomes and a second light source emitting background light toward the target plant,
the first light source including a plurality of light emitting diodes;
the background light having a different peak wavelength than a peak of the stimulation light,
an air blower operable to force air around the target plant to flow and ventilate a space around the target plant;
a controller controlling operation of the first light source unit and the second light source and operation of the air blower according to pre-stored data or user-input data such that:
the second light source emits the background light during a light period and stops emission of the background light during a dark period,
the first light source emits the stimulation light for a predetermined period of time during the light period, and
the first light source and the second light source are spaced apart from the target plant in an undivided space and arranged to directly apply the stimulation light to the target plant, and
a cumulative amount of the stimulation light emitted from the first light source is 0.036 J or more per day by selectively supplying current to one or more of the plurality of light emitting diodes and regulating the predetermined period of time during the light period;
wherein the controller is configured to regulate:
intensity of the stimulation light to increase content of fragrant molecules of the target plant having trichomes;
an air blowing time of the air blower to diffuse the fragrant molecules around the target plant having trichomes; and
intensity of the background light and an irradiation time of the background light such that a light intensity ranging from 50 PPFD ($\mu$ mol/m$^2$/s) to 250 PPFD ($\mu$ mol/m$^2$/s) is supplied to the target plant.

2. The plant cultivation device according to claim 1, wherein the predetermined period of time is one (1) hour.

3. The plant cultivation device according to claim 1, wherein the background light is visible light.

4. The plant cultivation device according to claim 1, further comprising a main body;
a support having a lower portion extending from one side of the main body in an upward direction and an upper portion bent from the lower portion to be located above the main body,
wherein the light source unit is secured to the upper portion of the support and above the target plant having trichomes and
the air blower is secured adjacent to the lower portion of the support and located on a side of the target plant having trichomes.

5. The plant cultivation device according to claim 1, further comprising: a main body having an internal space for cultivation of the target plant.

6. The plant cultivation device according to claim 5, wherein the internal space of the main body is filled with at least one of a medium and water.

7. The plant cultivation device according to claim 6, wherein the medium and water contain nutrients.

8. The plant cultivation device according to claim 1, wherein the air blower is a fan.

9. A cultivation device for plants having trichomes, comprising:
a main body;
a support having a lower portion extending from one side of the main body in an upward direction and an upper portion bent from the lower portion to be located above the main body,
a first light source emitting stimulation light in a UV region toward a target plant having trichomes; and
a second light source emitting background light toward the target plant,
the background light having a different peak wavelength than a peak of the stimulation light,
wherein the first light source and the second light source are secured to the upper portion of the support and above the target plant having trichomes; and
an air blower operable to force air around the target plant to flow and ventilate a space around the target plant,
wherein the air blower is secured adjacent to the lower portion of the support and located on a side of the target plant having trichomes;
a controller controlling operation of the first light source unit and the second light source and operation of the air blower according to pre-stored data or user-input data such that the first light source emits the stimulation light for a predetermined period of time when the second light source emits the background light, and the first light source and the second light source are spaced apart from the target plant in an undivided space and arranged to directly apply the stimulation light to the target plant; and wherein the controller is further configured to regulate:
intensity of the stimulation light to increase content of fragrant molecules of the target plant having trichomes;
an air blowing time of the air blower to diffuse the fragrant molecules around the target plant having trichomes; and
intensity of the background light and an irradiation time of the background light such that a light intensity ranging from 50 PPFD ($\mu$ mol/m$^2$/s) to 250 PPFD ($\mu$ mol/m$^2$/s) is supplied to the target plant.

10. The cultivation device according to claim 9, wherein the second light source emitting the background light is alternately turned on and off at intervals of twelve (12) hours.

11. The cultivation device according to claim 9, wherein the background light is visible light.

12. The cultivation device according to claim 9, wherein the predetermined period of time is one (1) hour.

13. The cultivation device according to claim 12, wherein a cumulative amount of the stimulation light emitted from the second light source is 0.036 J or more per day.

* * * * *